United States Patent [19]

Henney et al.

[11] 4,143,182

[45] Mar. 6, 1979

[54] POROUS BODIES

[75] Inventors: John W. Henney, Abingdon; Ronald S. Wilks, Newbury, both of England

[73] Assignee: United Kingdom Atomic Energy Authority, London, England

[21] Appl. No.: 806,062

[22] Filed: Jun. 13, 1977

Related U.S. Application Data

[63] Continuation of Ser. No. 609,105, Sep. 23, 1976, abandoned.

[30] Foreign Application Priority Data

Sep. 10, 1974 [GB] United Kingdom ............... 39510/74

[51] Int. Cl.² ............................................. B05D 3/02
[52] U.S. Cl. ................................. 427/226; 427/343; 427/344; 427/377; 427/380; 427/399; 427/419 B; 427/419 C; 427/419 E
[58] Field of Search ................. 427/380, 399, 87, 344, 427/377, 226, 343, 419 B, 419 C, 419 E

[56] References Cited

U.S. PATENT DOCUMENTS

| | | | |
|---|---|---|---|
| 2,490,260 | /1951 | Ehrhardt | 427/226 |
| 2,578,956 | 12/1951 | Weinrich | 427/250 |
| 3,078,186 | 2/1963 | Tierney | 427/419 C |
| 3,232,782 | 2/1966 | Shannon | 427/343 |
| 3,460,971 | 8/1969 | Bonis et al. | 427/419 B |
| 3,535,154 | 10/1970 | Meyer-Simon | 427/226 |
| 3,539,379 | 11/1970 | Mayer | 427/226 |
| 3,754,944 | 8/1973 | Hardy | 427/380 |
| 3,811,928 | 5/1974 | Henney et al. | 427/399 |
| 3,849,181 | 11/1974 | Green | 427/344 |
| 3,983,198 | 9/1976 | Mangels | 427/399 |
| 4,021,590 | 5/1977 | Vangbo | 427/344 |

*Primary Examiner*—Ronald H. Smith
*Assistant Examiner*—Janyce A. Bell
*Attorney, Agent, or Firm*—Larson, Taylor and Hinds

[57] ABSTRACT

The open pores of a porous silicon nitride body are partly or wholly filled with and adherent, refractory filler comprising cordierite or a borosilicate glass, thereby to reduce the gas-permeability of the body. A body, so treated, may, for example, have application as a recuperator.

4 Claims, No Drawings

POROUS BODIES

This is a continuation, of application Ser. No. 609,105 filed Sept. 23, 1976, now abandoned.

This invention relates to reduction of the gas-permeability of porous silicon nitride bodies.

A porous silicon nitride body, in this specification, relates to a silicon nitride body having sufficient open porosity to render the body gas-permeable. An example of such a body is a porous silicon nitride body produced by the known reaction bonding process, which usually has an open porosity in the range from 20% to 40% and may therefore be too permeable for applications where gas leakage is undesirable, for example, as a recuperator.

The present invention relates to a porous silicon nitride body whose gas-permeability has been reduced to render it suitable for such applications, without there being any substantial diminution in the known advantageous properties of the silicon nitride.

Thus, the present invention provides, in a first aspect, a porous silicon nitride body the open pores of which are partly or wholly filled with an adherent, refractory filler comprising cordierite or a borosilicate glass, thereby to reduce the gas-permeability of the body.

The cordierite or borosilicate fillers are particularly valuable in that they are resistant to heat and have coefficients of expansion which are not greater than that of silicon nitride. Thus, a body of the present invention wherein the filler comprises cordierite may be useful, in the form of a recuperator, for applications at temperatures of up to about 1050° C., and a body of the present invention wherein the filler comprises a borosilicate glass may be similarly useful but for applications at temperatures of up to about 900° C.

We prefer to use cordierite because its coefficient of expansion ($\sim 2.5 \times 10^{-6}/°$ C.) is similar to that of silicon nitride. Thus, no undue internal strain is developed on heating and cooling the body in contrast to the case if crystalline silica, for example, were used as the filler. Also, we have found that cordierite gives rise to an unexpectedly high reduction in gas-permeability having regard to the weight of cordierite used.

The proportion by weight of cordierite may, for example, be in the range from 10% to 15% based in the weight of silicon nitride.

If desired, a cordierite filler may contain silicon oxynitride in combination therewith. Silicon oxynitride has the advantage of being compatible with silicon nitride in that its coefficient of expansion is low and similar to that of silicon nitride.

When the filler comprises a borosilicate glass, we prefer that the $SiO_2$ content of the borosilicate is in the range from 5% to 20% by weight based on the weight of silicon nitride. We also prefer that the molecular ratio of $SiO_2$ to $B_2O_3$ in the borosilicate is not less than 5 to 1, and is advantageously 10 to 1.

Further aspects of the present invention include methods of making the bodies of the invention. Thus, in a second aspect, the present invention provides a method of reducing the gas-permeability of a porous silicon nitride body which comprises the steps of i. impregnating the body with a mixture of MgO and $Al_2O_3$ of controlled composition;
ii. subjecting the impregnated body to controlled oxidation to oxidise part of the silicon nitride to $SiO_2$; and
iii. firing in a non-oxidising atmosphere to partly or wholly fill the open pores of the body with cordierite, wherein steps (i) and (ii) are controlled to provide molecular ratios of $MgO : Al_2O_3$, $MgO : SiO_2$ and $Al_2O_3 : SiO_2$ such that cordierite is formed in step (iii).

It should be noted that, although the formula of cordierite is conventionally written as $2MgO.2Al_2O_3.5SiO_2$, cordierite may exist having molecular ratios of $SiO_2$ to MgO and of $SiO_2$ to $Al_2O_3$ which are not exactly 5 to 2 and a molecular ratio of MgO to $Al_2O_3$ which is not exactly 1 to 1, i.e., some variation from the molecular ratios indicated by the conventionally written formula is possible. However, we prefer that steps (i) and (ii) are controlled to give molecular ratios corresponding to the above formula.

Step (i) may conveniently be carried out by immersing the body in an aqueous solution of a magnesium compound, such as magnesium nitrate, which is decomposable to MgO, drying and decomposing the magnesium compound to MgO, and repeating the procedure using an aqueous solution of an aluminum compound such as aluminium nitrate, which is decomposable to $Al_2O_3$. The decomposition, in the case of both magnesium and aluminium compounds, may be carried out below 1000° C. and is preferably carried out below 800° C. The order of impregnation is not significant; thus, if desired the body may be impregnated with $Al_2O_3$ before it is impregnated with MgO or the impregnation can be simultaneous by using a solution that contains both magnesium and aluminium compounds. The amount of oxide provided is determined by the strength of the aqueous solution. The immersion, drying and decomposition process may be repeated if it is desired to increase the amount of oxide present. We prefer that the total amount of oxide present after impregnating is between 3% and 7% by weight based on the weight of silicon nitride (for example, about 5%). If desired, small proportions of oxides, other than MgO and $Al_2O_3$ capable of facilitating the subsequent formation of cordierite may additionally be provided. Thus, from 1% to 2% by weight (based on the total weight of MgO plus $Al_2O_3$) of an oxide such as lithium oxide, calcium oxide, manganese (III) oxide and yttrium oxide may be provided.

The oxidising step (step (ii)) may conveniently be carried out in air and at a temperature in excess of 1000° C.

When it is desired to form silicon oxynitride in addition to cordierite during the firing step (step (iii)), it may be necessary to carry out the firing at a temperature of 1400° C. or above, for example, in the range from 1400° C. to 1500° C. When the firing is carried out at temperatures below 1400° C., for example at 1300° C. to 1380° C., we have generally found that significant silicon oxynitride formation does not occur. We prefer to carry out the firing step in a static atmosphere because, if the body is subjected to a high rate of gas flow, volatilisation of the filler may occur at the firing temperature giving rise to a consequent increase in permeability. A convenient non-oxidising atmosphere for the firing step is an atmosphere of nitrogen.

The invention also provides, in a third aspect, a method of reducing the gas-permeability of a porous silicon nitride body which comprises the steps of a. impregnating the body with $B_2O_3$;
b. subjecting the impregnated body to controlled oxidation to oxidise part of the silicon nitride to $SiO_2$; and c. firing in a non-oxidising atmosphere to partly or wholly fill the open pores of the body with a borosilicate glass, wherein step (b) is controlled to provide a molecular ratio of $SiO_2 : B_2O_3$ such that a borosilicate glass is formed in step (c).

The impregnating step (step (a)) may be carried out by immersing the body in an aqueous solution of a boron compound, such as boric acid, which is decomposable to $B_2O_3$, drying and decomposing the boron compound to $B_2O_3$. We prefer that the total amount of boric oxide present after impregnating is between 1% and 4% by weight based on the weight of silicon nitride. If desired, small proportions of oxides, other than $B_2O_3$, capable of inhibiting volatilisation of boric oxide, may additionally be provided. Thus, up to 5% by weight (based on the weight of the boric oxide) of an oxide such as calcium oxide may be provided.

The oxidising step (step (b)) may conveniently be carried out in air and at a temperature in excess of 1000° C. We prefer to control the oxidising step to give from 5% to 20% by weight of $SiO_2$ based on the weight of silicon nitride. We also prefer that the molecular ratio of $SiO_2$ to $B_2O_3$ is not less than 5 to 1, and is advantageously 10 to 1.

A convenient non-oxidising atmosphere for the firing step (step (c)) is an atmosphere of nitrogen and a suitable firing temperature from 1200° C. to 1300° C.

The present invention also includes, in a further aspect, a porous silicon nitride body whose gas-permeability has been reduced by a method of the invention.

The invention will now be particularly described in the following examples.

EXAMPLE 1

A specimen of porous $Si_3N_4$ (~35% open porosity) was dipped into a hot solution of $Mg(NO_3)_2.6H_2O$ (22 g) and $Al(NO_3)_3.9H_2O$ (64 g) made up to 100 cc with water. After 30 minutes the specimen was removed and dried and then fired at 750° C. for 30 minutes to decompose the nitrates to oxides (MgO and $Al_2O_3$ respectively). Weighing showed that there had been an increase of 5.8% (by weight). The specimen was then oxidised by heating in air at 1100° C. for 1 hour to give a gain of 1.4% by weight (~6% by weight of $SiO_2$) and a product containing 12.6% by weight of cordierite based on the weight of $Si_3N_4$. Finally, the specimen was fired in nitrogen at 1380° C. for 4 hours. An X-ray powder study of the product showed the presence of cordierite and the absence of crystalline silica.

The coefficient of permeability of the product was measured by nitrogen flow and found to be $0.0002 \times 10^{-11}$. This compares with the coefficient of permeability of the porous silicon nitride body before treatment which had been found to be $0.33 \times 10^{-11}$.

EXAMPLE 2

The procedure of Example 1 was repeated except that the firing was carried out at 1450° C. for 4 hours. Analysis of the final product showed that it contained silicon oxynitride.

EXAMPLE 3

A specimen of porous $Si_3N_4$ was dipped for 15 minutes into a hot solution of boric acid (10 g) and $Ca(NO_3)_2.4H_2O$ (2 g) made up of 50cc with water. After drying the specimen was fired at about 750° C. for 30 minutes to decompose the boric acid to $B_2O_3$ and the $Ca(NO_3)_2$ to CaO. Weighing showed that a gain of 2% by weight had taken place. The specimen was then oxidised by heating in air at 1150° C. to give a weight gain of 2.8% by weight (~12% by weight of $SiO_2$). Finally, the specimen was fired in nitrogen for 2 hours at 1250° C.

The open porosity of the product was measured by paraffin displacement and found to be 5.5%. This compares with the open porosity of the porous silicon nitride body before treatment which had been found to be 35.7%.

We claim:

1. A method of providing a porous silicon nitride body with a filler for reducing the gas-permeability thereof which comprises the steps of
   i. impregnating the body with a mixture consisting essentially of MgO and $Al_2O_3$, wherein the ratio of MgO to $Al_2O_3$ is equimolecular;
   ii. oxidising the impregnated body to produce $SiO_2$ by oxidation of the silicon nitride, wherein the oxidation is stopped when the molecular ratio of $SiO_2$ to MgO is 5 to 2; and
   iii. firing in a non-oxidising atmosphere at a temperature of 1400° C. or above to produce cordierite and silicon oxynitride thereby to partly or wholly fill the open pores of the body with a mixture consisting essentially of said cordierite and silicon oxynitride.

2. A method according to claim 1 wherein the firing in step (iii) is carried out at a temperature in the range from 1400° C. to 1500° C.

3. A method of providing a porous silicon nitride body with a filler for reducing the gas-permeability thereof which comprises the steps of
   i. immersing the body in an aqueous solution of a magnesium compound which is decomposable to MgO, drying and decomposing the compound to MgO, immersing the body in an aqueous solution of an aluminum compound which is decomposable to $Al_2O_3$, drying and decomposing the compound to $Al_2O_3$, the ratio of the concentrations of said solutions being equimolecular with respect to one another and said decompositions providing said body with a mixture consisting essentially of MgO and $Al_2O_3$ wherein the mole ratio of MgO to $Al_2O_3$ is equimolecular.
   ii. oxidising the impregnated body to produce $SiO_2$ by oxidation of the silicon nitride, wherein the oxidation is stopped when the molecular ratio of $SiO_2$ to MgO is 5 to 2; and
   iii. firing in a non-oxidising atmosphere at a temperature of 1400° C. or above to produce cordierite and silicon oxynitride thereby to partly or wholly fill the open pores of the body with a mixture consisting essentially of said cordierite and silicon oxynitride.

4. A method according to claim 3, wherein the total amount of MgO and $Al_2O_3$ present after step (i) is between 3% and 7% based on the weight of silicon nitride.

* * * * *

UNITED STATES PATENT AND TRADEMARK OFFICE
CERTIFICATE OF CORRECTION

PATENT NO. : 4,143,182
DATED : March 6, 1979
INVENTOR(S) : HENNEY ET AL

It is certified that error appears in the above-identified patent and that said Letters Patent are hereby corrected as shown below:

In the title page, under "Related U.S. Application Data" please change the filing date "Sept. 23, 1976" to ---August 29, 1975---

Signed and Sealed this

Eleventh Day of March 1980

[SEAL]

*Attest:*

SIDNEY A. DIAMOND

*Attesting Officer*     *Commissioner of Patents and Trademarks*